United States Patent [19]

Esterowitz et al.

[11] 4,167,712

[45] Sep. 11, 1979

[54] PRASEODYMIUM BLUE-GREEN LASER SYSTEM

[75] Inventors: Leon Esterowitz, Springfield, Va.; Filbert J. Bartoli, Upper Marlboro, Md.; Roger E. Allen; Lawrence S. Goldberg, both of Alexandria, Va.; Van O. Nicolai, Reston, Va.; Melvin R. Kruer, Oxon Hill, Md.; Arthur Linz, Winchester; Hans P. Jenssen, Belmont, both of Mass.

[73] Assignee: The United States of America as represented by the Secretary of the Navy, Washington, D.C.

[21] Appl. No.: 874,005

[22] Filed: Jan. 31, 1978

[51] Int. Cl.$^2$ ............................................. H01S 3/094
[52] U.S. Cl. ............................ 331/94.5 F; 331/94.5 P
[58] Field of Search ...................... 331/94.5 F, 94.5 P, 331/94.5 L

[56] References Cited

U.S. PATENT DOCUMENTS 4,054,852  10/1977  Nicolai .......................... 331/94.5 P

*Primary Examiner*—William L. Sikes
*Attorney, Agent, or Firm*—R. S. Sciascia; Sol Sheinbein

[57] ABSTRACT

Improvements in Praseodymium solid state YLF lasers operating in the blue-green spectral region at room temperature and providing short pulses useful for underwater communication and detection systems. A dye laser with a narrow spectral output matched to the absorption spectra of the solid state laser is provided as a laser pump. The Pr doped YLF crystal of the solid state laser is physically oriented so it can be longitudinally pumped by light polarized parallel to the c-axis of the crystal, and the solid state laser is equipped with special spectrally selective mirrors. The foregoing and other modifications of prior Pr solid state laser systems provide increased efficiency and power output.

10 Claims, 1 Drawing Figure

PRASEODYMIUM BLUE-GREEN LASER SYSTEM

BACKGROUND OF THE INVENTION

This invention relates generally to lasers and more particularly to solid state lasers operating in the blue-green spectral region.

Blue-green lasers are very desirable for underwater uses due to their low transmission losses in water. Such lasers include metal vapor lasers, gas lasers and frequency doubled solid state lasers. It has been found that a relatively efficient laser system emitting pulses of short duration in the blue-green spectral region may be constructed by using a dye laser pumped by a mercury capillary lamp to, in turn, pump a Praseodymium doped solid state laser, as described in U.S. Pat. No. 4,052,852 to Nicolai issued Oct. 18, 1977. In this laser system, a good spectral match is achieved between the capillary lamp and the dye laser, providing good power coupling and efficiency. By Q-switching, solid state laser pulses of high power and short duration are produced. Unfortunately, this laser system has been subject to serious limitations because the threshold for lasing using previous methods has been higher than the damage threshold of the laser crystal. Since this is a three level laser, the flexibility and options available for reducing the power requirements for lasing are severely limited.

Deficiencies in other blue-green lasers are low efficiency, reliability, repetition rate, pulse energy, lifetime, and extremely low temperature operation which makes such use impractical. It is desirable to develop a laser around 4800 Å which would have performance and reliability specification similar to Nd:YAG at 1.06 $\mu$m. Unfortunately, double YAG at 0.53 $\mu$m is too long a wavelength for many applications.

SUMMARY OF THE INVENTION

Accordingly, there is provided an improved Praseodymium solid state laser system operating at room temperature and providing short duration, high power, blue-green pulses useful for underwater communication and detection.

An investigation of the thermal and spectroscopic properties of the Pr doped YLF crystal has revealed a sharp absorption maximum at 444 nm and has revealed that the transition probabilities for $\pi$ polarized radiation are much higher than those for $\sigma$ radiation. In light of these facts and by the application of advanced optical design principles to the dye laser pump, solid state laser cavity, and associated system components, the power requirements for lasing having been minimized in the present invention and the pump energy has been kept below the crystal damage threshold.

A dye laser with a narrow spectral output centered at 444 nm and matched to the absorption spectrum of a Pr:YLF crystal is used as a laser pump for the solid state laser. The Pr doped YLF crystal of the solid state laser is oriented with its c-axis perpendicular to the axis of the laser cavity so it may be pumped by $\pi$ polarized light, and the faces of the crystal are cut at Brewster's angle to minimize reflection losses. Spectrally selective mirrors are provided for the solid state laser to discriminate against radiation components of undesirable frequencies and especially to help suppress lasing of the orange and red transistions in the Pr:YLF solid state laser.

OBJECTS OF THE INVENTION

It is therefore an object of the present invention to provide an improved blue-green Praseodymium solid state laser.

Another object of the present invention is to provide a Praseodymium solid state laser in which the threshold for lasing is below the damage threshold for the laser crystal.

A further object of the present invention is to provide a reliable blue-green laser capable of producing high power, short duration pulses especially useful for underwater communication and detection.

A yet further object of the present invention is to provide an efficient and reliable blue-green laser which is otherwise well adapted to the purposes for which it is intended.

BRIEF DESCRIPTION OF THE DRAWING

These and other objects, features, and attendant advantages of the present invention will become better understood by reference to the following detailed description when considered in conjunction with the accompanying drawing wherein:

The FIGURE shows a partial block and partial schematic diagram of the laser system according to the present invention.

DETAILED DESCRIPTION OF THE PREFERRED EMBODIMENT

Figure 1:
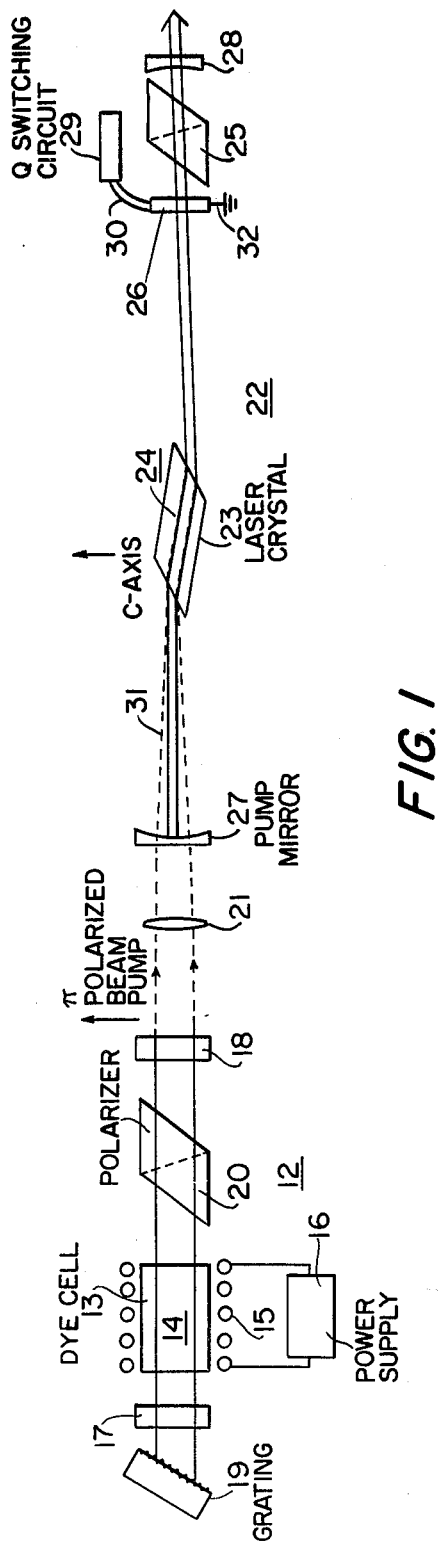

Referring now to the FIGURE, there is shown a dye laser 12 which functions as pumping laser in the present invention. Dye laser 12 comprises a dye cell 13 containing the lasing material 14, with a pumping lamp 15 located alongside lasing material 14 connected to power source 16. Mirror 17 and output mirror 18 are placed at respective ends of the lasing material 14, and optical grating 19 is situated at the terminal end of the dye laser just past mirror 17. Polarizer 20 is disposed between dye cell 13 and output mirror 18, and lens 21 is placed at the output end of the dye laser past output mirror 18.

Dye laser 12 employs cooled Methanol solution of Coumarin 440 dye or Coumarin 450 dye disposed in a conventional dye cell 13 as its lasing material 14. Pumping lamp 15 and power source 16 comprise, repectively, a helical mercury capillary flashlamp and a capacitor power supply system arranged to electrically drive the flashlamp. Mirror 17 and optical grating 19 together form a special frequency selective end reflector for the dye laser. Mirror 17 is chosen to have a reflectivity of approximately 35% allowing light from lasing material 14 to pass through to optical grating 19. Optical grating 19 comprises a linearly ruled reflection grating which disperses light in a frequency dependent manner. Optical grating 19 is also adjustable so only light having wavelength of approximately 444 nm is reflected back through mirror 17 into lasing material 14. Polarizer 20 comprises an intracavity Brewster's angle polarizer such as a Glan Thompson Prism which forces the dye laser to oscillate with $\pi$ polarization relative to the solid state laser crystal 23 which preferentially absorbs $\pi$ polarized radiation. Output mirror 18 has a reflectivity of approximately 50% which allows some light to pass through it and serve as the pumping laser output. Lens 21 focuses the pumping laser output beam.

In operation, pumping lamp 15 raises the energy level of atoms in lasing material 14 to a metastable energy level above their normal ground level. As the atoms return to their ground level, they give off a burst of light energy of a particular frequency determined by the difference between the metastable level and the ground level. Mirrors 17 and 18 reflect this light back into lasing material 14 thus stimulating more atoms to emit light and allowing oscillation. The partially reflective character of output mirror 18 permits some of the light from lasing material 14 to pass through it to serve as the pumping laser output comprising a pulse of light several hundred nanoseconds long which is directed by lens 21 into the center of the solid state laser crystal 23. The above described operation of dye laser 12 is especially unique herein by the action of the optical grating 19—mirror 17 combination and the polarizer 20. In combination, the optical grating 19 and mirror 17 provide adequate end reflectivity, and maintain the optical flux on the grating below its damage threshold. However, more importantly, the optical grating 19 and mirror 17 disperse light from lasing material 14 of undesired frequency, forcing the dye laser 12 to oscillate at a wavelength of 444 nm with a linewidth of 0.2 nm. The polarizer 20 forces the dye laser 12 to oscillate with $\pi$ polarization relative to the solid state crystal 23. Light of wavelength 444 nm and light having $\pi$ polarization are preferentially absorbed by the solid state laser crystal 23. Further, the output of the dye laser 12 is focused into the center of the solid state crystal 23 using lens 21 which matches modes of the dye laser and solid state laser cavities. Thus, the dye laser provides pumping pulse radiation to the solid state laser 22 for which the threshold for lasing and power requirements should be minimum.

The solid state laser of the present invention is shown comprising laser crystal 23 of laser material 24, pump mirror 27 and output mirror 28 placed at opposite ends of lasing material 24, and optional components polarizer 25 and Q-switching device 26 positioned between crystal 23 and output mirror 28.

Lasing material 24 comprises a solid state crystal lattice of $YLiF_4$ (YLF) doped with up to 0.3% mole concentration of Praseodymium, $Pr^{3+}$, ions. The laser crystal 23 should be at least 4 mm in length, preferably 8 mm, however, it should not be so long as to permit lasing to occur for the red and orange transistions which have higher oscillator strengths. The end faces are polished and uncoated. The Pr:YLF laser crystal 23 is oriented with its c-axis perpendicular to the axis of the laser cavity, and has its crystal faces cut so they are oriented at Brewster'angle relative to light reflected by mirrors 27 and 28 back into the crystal. Mirrors 27 and 28 have spectrally selective reflectivities chosen to improve the efficiency of the solid state laser. Pump mirror 27 has maximum reflectivity, close to 100%, at 479 nm and minimum reflectivity at both longer and shorter wavelengths. Output mirror 28 has a maximum reflectivity of 70% at 479 nm in order to reinforce oscillation while allowing some light to pass through it and serve as the solid state laser output.

In operation, light from dye laser 12 is focused by lens 21 through pump mirror 27 into the center of the crystal 23 as indicated by line 31 which shows the path of the pump beam from the dye laser 12. This light energy raises the energy level of atoms in lasing material 24 from the ground state $^3H_4$ to the $^3P_2$ excited state corresponding to 444 nm from which they drop to the $^3P_0$ metastable energy level above their normal ground level. As the atoms return to their ground level, they give off a burst of light energy of 479 nm wavelength as levels by the energy difference between the metastable and ground level and corresponding to the $^3P_0-r_1 \rightarrow ^3H_4-r_2$ (0 cm$^{-1}$) transition. Mirrors 27 and 28 reflect this light back into lasing material 24 thus stimulating more atoms to emit light and allowing oscillation. The partially reflective character of output mirror 28 permits some light from lasing material 24 to pass through it and serve as the solid state laser 22 output, comprising a pulse of blue-green light several hundred nanoseconds long.

The operation of the solid state laser 22 is unique in the present invention by the special interaction qualities of the 444 nm wavelength, $\pi$ polarized light from the dye laser 12, the spectral qualities of the mirrors 27 and 28, and the end face angles of crystal 23. It has been found that the absorption spectra of Pr:YLF material has a sharp absorption maximum at wavelength 444 nm with a linewidth of 0.2 nm. As discussed hereinabove, the frequency spectra of the dye laser 12 was chosen to match the absorption spectra of the Pr:YLF solid state laser crystal 23, thus providing for maximum pump absorption and highly efficient coupling between the dye laser 21 pump and the solid state laser 22.

The transition probabilities of $\pi$ polarized pumping radiation are much higher than for $\sigma$ polarized radiation. Consequently, the orientation of the laser crystal 23 with its c-axis perpendicular to the axis of the laser cavity so it may be longitudinally pumped by $\pi$ polarized light, polarized parallel to the c-axis of the laser crystal 23, additionally provides for efficient coupling between the dye laser 12 and solid state laser 22. Pump mirror 27 has high transmission at 444 nm to pass the pump radiation from the dye laser 12, high reflectivity at 479 nm to efficiently reflect the lasing radiations of laser material 24 thus reinforcing oscillations at wavelength 479 nm, and high transmission in the orange and red spectral regions to discriminate against energy losses due to completing laser action at these wavelengths. Because of the same considerations, the transmission of the output mirror 28 must be similar to mirroer 27. Output mirror 28 has moderately high reflectivity at 479 nm to reflect laser radiations from laser material 24 thus reinforcing oscillations at 479 nm and high transmission in the orange and red spectral regions to discriminate against energy losses due to completing laser action at these wavelengths by their suppression. However, the transmission of the output mirror 28 at 479 nm is chosen to permit some light to pass through and serve as the solid state laser 22 output, and to maximize the output depending on the exact material and spectroscopic characteristics of the Pr:YLF laser crystal 23 and the losses in the laser cavity and the intensity of the pumping radiation. The orientation of the crystal faces at Brewster's angle relative to light reflected by mirrors 27 and 28 improves efficiency by minimizing reflection of $\pi$ polarized light at the crystal faces, and concurrently discriminates against any $\sigma$ polarized light by providing for high reflectivity of $\sigma$ polarized radiations. Further, the lens 21 is adjusted so that the pump beam is focused in the center of the laser crystal with a beam diameter approximately equal to cavity mode diameter, matching the modes of the dye and solid state laser cavities and providing for improved efficiency of coupling between the dye laser 12 and solid state laser 22. This both lowers the pump requirements for lasing and minimizes the risk of surface damage on the laser crystal 23.

To provide pulses of shorter duration and higher power, Q-switching device 26, which may comprise a Pockels cell, and polarizer 25, which may comprise a Glan Thompson Prism, may be incorporated with the solid laser 22 of the present invention. Q-switching device 26 is coupled to a conventional Q-switching circuit 29 by electrode 30 and to ground by electrode 32. With Q-switching device 26 placed in its first mode by Q-switching circuit 29, the polarization of light emitted from laser material 24 is changed by Q-switching device 26 to prevent its passage through polarizer 25 to output mirror 28. This prevents any oscillation of solid state laser 22 and instead provides a large buildup of atoms in the metastable state in laser material 24. When Q-switching circuit 29 switches Q-switching device 26 into its second mode, radiation from laser material 24 is permitted to pass through polarizer 25 to output mirror 28 and from the output mirror back to laser material 24, thus stimulating a very high power burst of energy as a large store of atoms change from their metastable to ground states. This sudden burst provides short duration (e.g. 20 nsec.) high power pulses desired for many underwater applications.

Therefore, there has been described an improved blue-green Pr:YLF solid state laser system. A pumping laser has been provided furnishing 444 nm wavelength, 0.2 nm line-width $\pi$ polarized output which is preferentially absorbed by Pr:YLF laser materials. A solid state laser has been provided with its laser crystal oriented so as to promote preferential absorption of $\pi$ polarized light, with its laser crystal faces cut so as to minimize reflection and discriminate against undesirable radiations, with its mirrors modified so as to be spectrally selective and so discriminate against energy dissipating transitions in the orange and red spectral regions. Further, the cavity modes of the pumping and Pr:YLF laser have been efficiently matched. Approximately 70% of the pump radiation, polarized parallel to the c-axis of the crystal, is absorbed. The foregoing improvements in Pr:YLF solid state laser system design result in a laser of greatly increased efficiency for which the lasing threshold and therefore the pump requirements for lasing are greatly reduced to approximately 2mJ out of the pumping laser. Consequently, the risk of damage to the laser crystal is minimized. The present invention provides a practical, efficient, and reliable room temperature blue-green Pr:YLF solid state laser providing very short duration pulses with high energy suitable for underwater applications. The long energy storage time of the $^3P_0$ level provides a useful means to convert long pulse dye laser excitation to Q-switch output in this spectral region.

Obviously, other embodiments and modifications of the present invention will readily be apparent to those of ordinary skill in the art having the benefit of the teachings presented in the foregoing description and drawings. For example, the optical grating used in the dye laser may be replaced by a series of etalons. Different cavity configurations and transverse pumping schemes are also feasible. Other rare earth ions and host crystals may be employed for potential four-level room temperature operation in the blue-green region. It is, therefore, to be understood that this invention is not to be limited thereto and that said other embodiments and modifications are intended to be included within the scope of the appended claims.

What is claimed and desired to be secured by letters patent of the United States is:

1. In combination with a blue-green laser system of the type wherein a dye laser is used to pump a crystal lattice doped with Praseodymium solid state laser, the improvement which comprises:
   means for forcing said dye laser to oscillate at a wavelength corresponding to a spectral absorption maximum of said crystal lattice.

2. The blue-green laser system of claim 1 wherein said crystal lattice is oriented with its c-axis perpendicular to the axis of said solid state laser cavity linewidth, and further including the improvement which comprises:
   a polarizer which acts in cooperation with said dye laser for forcing said dye laser to oscillate with $\pi$ polarization relative to said crystal lattice.

3. A blue-green laser system, comprising:
   a Praseodymium doped crystal lattice;
   an input mirror placed in proximity to said crystal lattice;
   an output mirror placed in proximity to said crystal lattice opposite said input mirror;
   a dye laser for pumping said solid state laser;
   means for forcing said dye laser to oscillate at a wavelength corresponding to a spectral absorption maximum of said crystal lattice.

4. The blue-green laser system of claim 3 wherein said crystal lattice is oriented with its c-axis perpendicular to the axis of the solid state laser cavity, and further including a polarizer which acts in cooperation with said dye laser for forcing said dye laser to oscillate with $\pi$ polarization relative to said crystal lattice.

5. The blue-green laser system of claim 4, wherein said input mirror has maximum reflectivity at approximately 479 nm wavelength and minimum reflectivities at shorter and longer wavelengths, and said output mirror has minimum reflectivity in the orange and red spectral regions and moderate reflectivity at approximately 479 nm wavelength.

6. The blue-green laser system of claim 4, wherein said crystal lattice has its crystal faces cut at Brewster's angle relative to reflections from the input and output mirrors, whereby reflection losses are minimized, said dye laser oscillation in a narrow linewidth.

7. The blue-green laser system of claim 4, further including a lens system for coupling the output of said dye laser into said solid state laser and focusing said output into said crystal lattice with a beam diameter approximately matching the cavity mode diameter of said solid state laser.

8. The blue-green laser system of claim 4, wherein said dye laser comprises a solution of Coumarin 440 dye pumped by a mercury capillary lamp.

9. The blue-green laser of claim 4, further including:
   a second polarizer placed between said crystal lattice and said output mirror;
   a Q-switching device placed between said crystal lattice and said output mirror operably for limiting the output pulses of said solid state laser to shorter duration than the duration of said dye laser pulses.

10. The blue-green laser of claim 4, wherein:
    said means for forcing said dye laser to oscillate at a wavelength corresponding to a spectral absorption maximum of said crystal lattice comprises a linearly ruled reflection grating.

* * * * *